US011558472B2

(12) United States Patent
Goddard

(10) Patent No.: US 11,558,472 B2
(45) Date of Patent: Jan. 17, 2023

(54) AUGMENTED REALITY POSITIONING AND MATCHING SYSTEM

(71) Applicant: Daniel Goddard, Calabasas, CA (US)

(72) Inventor: Daniel Goddard, Calabasas, CA (US)

(*) Notice: Subject to any disclaimer, the term of this patent is extended or adjusted under 35 U.S.C. 154(b) by 0 days.

(21) Appl. No.: 17/684,301

(22) Filed: Mar. 1, 2022

(65) Prior Publication Data
US 2022/0279048 A1     Sep. 1, 2022

Related U.S. Application Data

(60) Provisional application No. 63/155,284, filed on Mar. 1, 2021.

(51) Int. Cl.
| | |
|---|---|
| *H04L 67/306* | (2022.01) |
| *H04W 4/02* | (2018.01) |
| *G06Q 50/00* | (2012.01) |
| *G06T 11/00* | (2006.01) |
| *H04W 88/02* | (2009.01) |

(52) U.S. Cl.
CPC ......... *H04L 67/306* (2013.01); *G06Q 50/01* (2013.01); *G06T 11/00* (2013.01); *H04W 4/023* (2013.01); *H04W 88/02* (2013.01)

(58) Field of Classification Search
CPC ......... A63F 13/65; B25J 11/001; G06F 3/013; G06F 3/0304; G06F 3/04817; G06F 16/29; G06F 21/36; G06F 7/026; G06K 9/6256; G06Q 10/06; G06Q 10/06375; G06Q 10/1093; G06Q 30/02; G06Q 30/0631; G06Q 30/08; G06Q 50/01; G06Q 10/107; G06T 11/00; G06T 19/006; G06T 7/207; G06T 11/60; G06V 20/20; G06V 40/1365; G06V 40/171; H04B 5/0025; H04L 67/306; H04L 67/52; H04L 51/04; H04L 51/52; H04L 65/1083; H04L 69/329; H04N 21/25841; H04N 21/4788; H04W 4/023; H04W 88/02; H04W 4/80; H05K 999/99
USPC ......... 345/633; 348/14.02, 333.01; 455/41.2; 700/259; 705/325; 707/722; 709/204, 709/206; 715/716, 751
See application file for complete search history.

(56) References Cited

U.S. PATENT DOCUMENTS

| | | | |
|---|---|---|---|
| 8,446,453 B2* | 5/2013 | Tian .................... | H04L 65/1083 348/14.02 |
| 8,789,094 B1* | 7/2014 | Singh .................. | H04N 21/4788 725/62 |
| 9,001,252 B2* | 4/2015 | Hannaford ............ | G06T 19/006 348/333.01 |

(Continued)

*Primary Examiner* — Gerald Gauthier
(74) *Attorney, Agent, or Firm* — Cynthia S. Lamon; Lamon Patent Services

(57) ABSTRACT

A matching and communication system has a first mobile device associated with a first user, and a second mobile device associated with a second user, an Internet connected server having a processor executing coded instructions, and coupled to a data repository, a first profile for the first user, comprising a photograph of the first user and a plurality of first hashtags in the first profile, the first profile stored in the data repository; and a second profile for the second user, comprising a photograph of the second user and a plurality of second hashtags in the second profile, the second profile stored in the data repository. The server determines that the devices are proximate a profile post is displayed for the second user in a display for the first user.

10 Claims, 9 Drawing Sheets

(56) References Cited

U.S. PATENT DOCUMENTS

| | | | |
|---|---|---|---|
| 10,127,734 B2* | 11/2018 | Stroila | H05K 999/99 |
| 10,594,990 B1* | 3/2020 | Lemberger | H04W 4/80 |
| 10,679,187 B2* | 6/2020 | Kenthapadi | G06F 7/026 |
| 10,706,477 B1* | 7/2020 | Le chevalier | G06V 40/1365 |
| 10,748,339 B2* | 8/2020 | Haines | G06T 19/006 |
| 11,115,485 B2* | 9/2021 | Bravo Avina | H04L 67/52 |
| 2005/0177614 A1* | 8/2005 | Bourne | H04L 51/52 709/200 |
| 2005/0188010 A1* | 8/2005 | Valk | H04L 69/329 709/203 |
| 2008/0215689 A1* | 9/2008 | Pietila | H04L 67/306 709/206 |
| 2010/0094863 A1* | 4/2010 | Kenton-Dau | G06Q 10/06375 706/54 |
| 2011/0225510 A1* | 9/2011 | Lavrov | H04W 4/023 715/751 |
| 2012/0246089 A1* | 9/2012 | Sikes | G06Q 10/1093 705/325 |
| 2012/0246231 A1* | 9/2012 | Norena | G06Q 50/01 709/204 |
| 2014/0164921 A1* | 6/2014 | Salinas | G06F 16/29 715/716 |
| 2015/0171926 A1* | 6/2015 | Coelho | H04B 5/0025 455/41.2 |
| 2015/0314454 A1* | 11/2015 | Breazeal | B25J 11/001 700/259 |
| 2016/0014069 A1* | 1/2016 | Carter | H04L 51/04 709/206 |
| 2016/0093106 A1* | 3/2016 | Black | G06V 20/20 345/633 |
| 2017/0046439 A1* | 2/2017 | Gellis | G06Q 30/08 |
| 2017/0169495 A1* | 6/2017 | Rathus | G06F 21/36 |
| 2017/0201524 A1* | 7/2017 | Dureau | H04N 21/25841 |
| 2018/0046680 A1* | 2/2018 | Deutsch | G06Q 50/01 |
| 2018/0293771 A1* | 10/2018 | Piemonte | G06T 11/60 |
| 2019/0019337 A1* | 1/2019 | Monsarrat | A63F 13/65 |
| 2019/0122045 A1* | 4/2019 | Ravi | H04L 67/306 |
| 2019/0197312 A1* | 6/2019 | Lahood | G06V 20/20 |
| 2019/0213622 A1* | 7/2019 | Strowbridge | G06Q 30/0631 |
| 2020/0402311 A1* | 12/2020 | Trim | G06Q 30/02 |
| 2021/0004597 A1* | 1/2021 | Dascola | G06T 7/207 |
| 2021/0049348 A1* | 2/2021 | Qureshi | G06V 40/171 |
| 2021/0185479 A1* | 6/2021 | Shingler | H04W 4/023 |
| 2021/0359969 A1* | 11/2021 | Wang | G06Q 10/06 |
| 2021/0397834 A1* | 12/2021 | Black | G06V 20/20 |
| 2022/0103969 A1* | 3/2022 | Drummond | G06Q 10/107 |

* cited by examiner

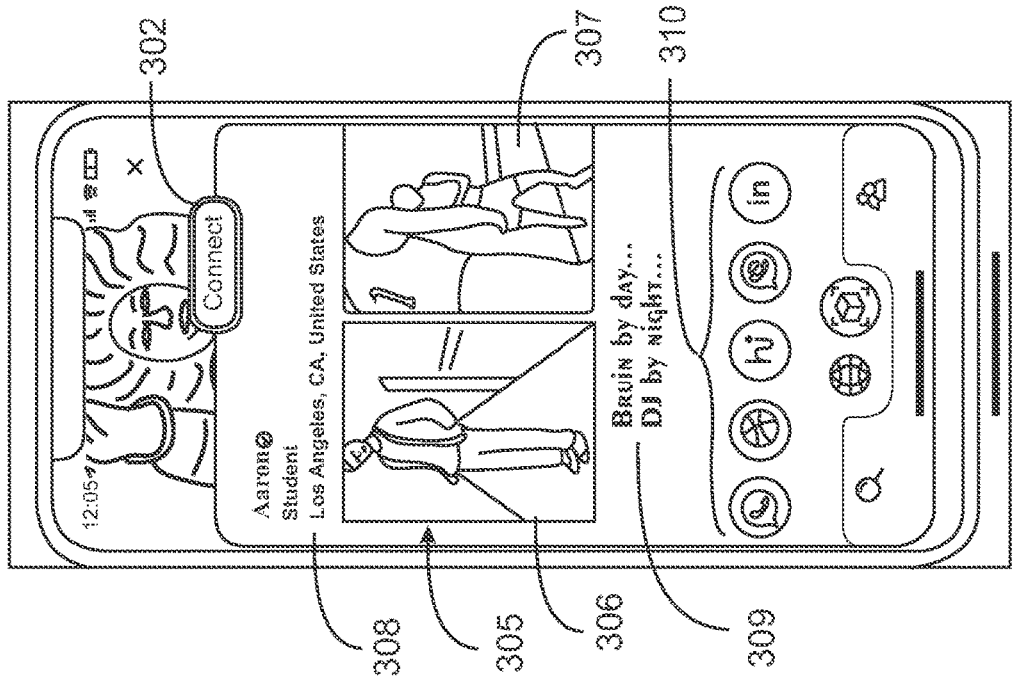
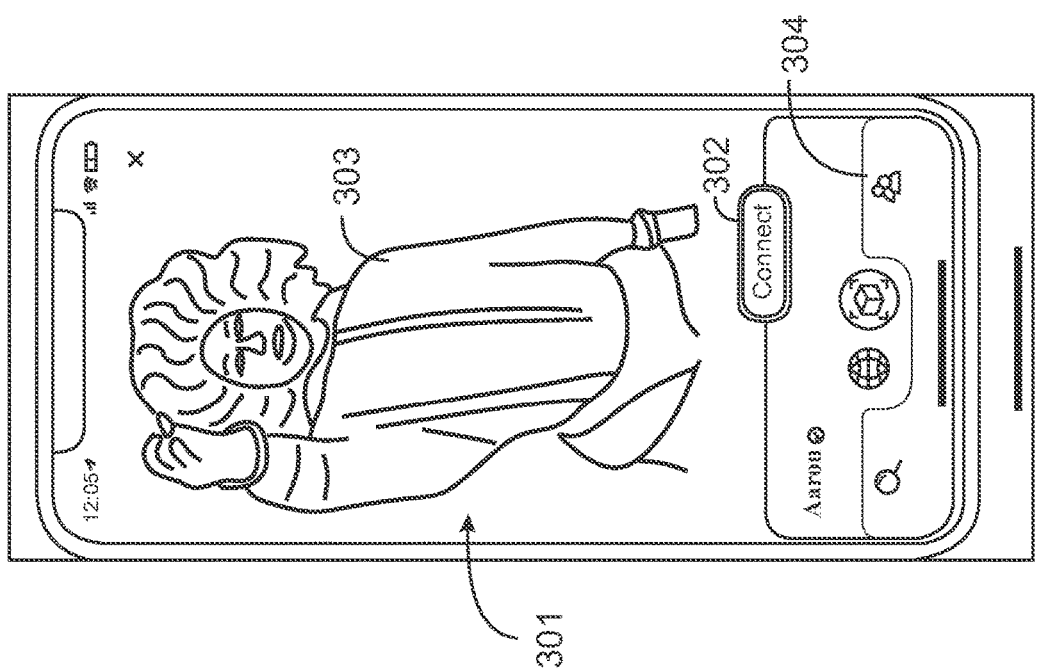
Fig. 3B
Fig. 3A

AUGMENTED REALITY POSITIONING AND MATCHING SYSTEM

CROSS-REFERENCE TO RELATED DOCUMENTS

The present application claims priority to provisional patent application 63/155,284 filed Mar. 1, 2021. All disclosure of the parent documents is incorporated at least by reference.

BACKGROUND OF THE INVENTION

1. Field of the Invention

The present invention is in the technical field of augmented reality (AR) and pertains more particularly to an application enabling users to match with and connect with other users.

2. Description of Related Art

There exist in the art a variety of applications, like, for example, dating applications, which purport to connect users who have common backgrounds and interests, according usually to entered profiles. To the inventor's knowledge, however, there is no application that leverages augmented reality technology in such an application.

BRIEF SUMMARY OF THE INVENTION

In an embodiment of the invention a matching and communication system is provided, comprising a first mobile device associated specifically with a first user, the first mobile device having first imaging apparatus and first GPS circuitry, executing a mobile application, and coupled to an Internet network, a second mobile device associated specifically with a second user, the second mobile device having second imaging apparatus and second GPS circuitry, executing the mobile application, and coupled to the Internet network, an Internet connected server having a processor executing coded instructions, and coupled to a data repository, a first profile for the first user, comprising a photograph of the first user and a plurality of first hashtags in the first profile, the first profile stored in the data repository, and a second profile for the second user, comprising a photograph of the second user and a plurality of second hashtags in the second profile, the second profile stored in the data repository. The system is characterized in that the first user captures image data by the first imaging apparatus of the first mobile device, the image data is transmitted to the internet connected server, the internet connected server, executing the coded instructions, determines by GPS that the second mobile device is proximate the first mobile device, creates a profile post from the profile of the second user, the profile post comprising the photograph of the second user, combines the profile post with the image data received from the first user by an augmented reality (AR) algorithm, transmits the resulting augmented reality image data back to the first mobile device, and the first mobile device displays the augmented reality image data on a display of the first mobile device with the profile post of the second user positioned and sized in the display according to relative position of the first and second mobile devices determined by the internet connected server.

In one embodiment the system further comprises the profile post for the second user in the display of first mobile device rendered as a link that when selected navigates to an enhanced version of the profile post comprising a connect link adapted to initiate a video call from the first mobile device to the second mobile device. Also, in one embodiment the enhanced version of the profile post comprises a link adapted to navigate to a display of the profile of the second user, comprising at least a name and location of the second user, additional image data of the second user, a social message by the second user, and additional information regarding the second user. In one embodiment posting the profile post of the second user in the AR display requires a predetermined percentage match of hashtags of the second user with hashtags of the first user. And in one embodiment posting of the profile post of the second user in the AR display requires satisfying additional criteria regarding the profile of the second user to the matching of hashtags. In one embodiment of the system the additional criteria comprise at least gender, brand, and an age range.

In one embodiment the system further comprises a plurality of second mobile devices associated with specific second users, a plurality of second profiles for the second users, each second profile comprising a photograph of the specific second user and a plurality of hashtags in each second profile, the second profiles stored in the data repository, wherein profile posts for individual ones of the plurality of second users are posted in the first user's AR display depending on a predetermined hashtag percentage match to hashtags of the first user, and the postings are positioned and sized in the AR display according to relative positions of the plurality of second mobile devices determined by the internet connected server. In one embodiment the system further comprises a computerized platform associated with a Brand, being an enterprise offering products and services, and a third profile for the Brand, the third profile comprising hashtags defining products and services offered by the Brand, wherein the third profile comprises selected locations for displaying a profile post for the Brand, and wherein, when the location of the first mobile device is proximate a selected location for the Brand, a profile post for the Brand is transmitted in the AR image data to the first mobile device, and the Brand profile post displays in the display of the first mobile device positioned and sized in the display according to relative position of the first mobile device and the selected location for the brand profile post. And in one embodiment selecting the Brand profile post by the first user navigates to the third profile, and an interactive interface is presented to the first user enabling interaction with the Brand, including transacting for products and services of the Brand.

In another aspect of the invention a matching and communication system is provided comprising a plurality of mobile devices associated with specific users, each mobile device having GPS circuitry and imaging apparatus and executing an appropriate version of a mobile application, an Internet connected server having a processor executing coded instructions, and coupled to a data repository, a plurality of user profiles, one per user stored in the data repository, each profile comprising a plurality of hashtags, and a plurality of avatars, one associated with each profile, stored in the data repository, each avatar comprising a picture of the user associated with the profile. The system is characterized in that an individual ones of the plurality of users are enabled to enter a location anywhere on Earth, and the system in response will stream AR image data to that entering user's mobile device, regardless of the device location, the AR image data including avatars for users and live AR video feeds, at or near the entered location for which match criteria is met, and wherein the individual users are enabled to select any avatar displayed and to initiate an interaction with the user associated with the avatar via any one of text, chat, voice messaging, calls and video chat.

In one embodiment users are enabled to schedule interactions with other users by organizing an event to occur at a specific location over a specific time period and to select specific users to be invited by sending a code, to attend and interact with other user's avatars at the event, wherein avatars are displayed as a result of satisfying match criteria.

BRIEF DESCRIPTION OF THE SEVERAL VIEWS OF THE DRAWINGS

FIG. 3A illustrates a profile post for a user in an embodiment of the invention.

FIG. 3B illustrates an actual profile for the user associated with the profile post of FIG. 3A.

DETAILED DESCRIPTION OF THE INVENTION

In an embodiment of the invention a system is provided in which augmented reality (AR) matching technology enables a user of the system to be discovered and viewed in AR by other users who are looking to match or have things in common and might like to match & connect. A user may be instantiated in the system as a person, having personal attributes, hashtags, preferences and other profile attributes, or as a Brand. A Brand represents a company and\or product or range of services as a recognized entity. Ben and Jerry's Ice Cream is an example of a Brand that might be an entity represented by a PROFILE POST in an embodiment of the invention. To avoid confusion the specification will refer to and describe Users and Brands separately.

To participate in the Dysko system a user (general term) downloads a specific Dysko mobile application from an App store such as Apple Store™. Personalization and specification are implemented when the user first executes the mobile application on an AR-capable device, such as the user's Smartphone. In that process the user is guided through a process wherein the user may define a user or a Brand. It should be understood that in the circumstance of creating a Brand configuration will be done by an agent of the business or enterprise for which the Brand is being created.

In the Dysko system Augmented Reality (AR) device platforms (smartphones) are used in order to position objects and posts in AR space. Each object/post has also a GPS location. Using the user's device GPS and compass (direction) data an object or post is positioned in an AR display at a correct distance and direction in ARKit/ARCore world coordinates overlaid on a 3D grid that surrounds the user when using camera view when entering AR mode. The object or post size in the display is changed based on the distance from the user. In this way the objects or posts are at the same distance from the user's point of view, while in reality the objects can be near or far away.

Figure 1:
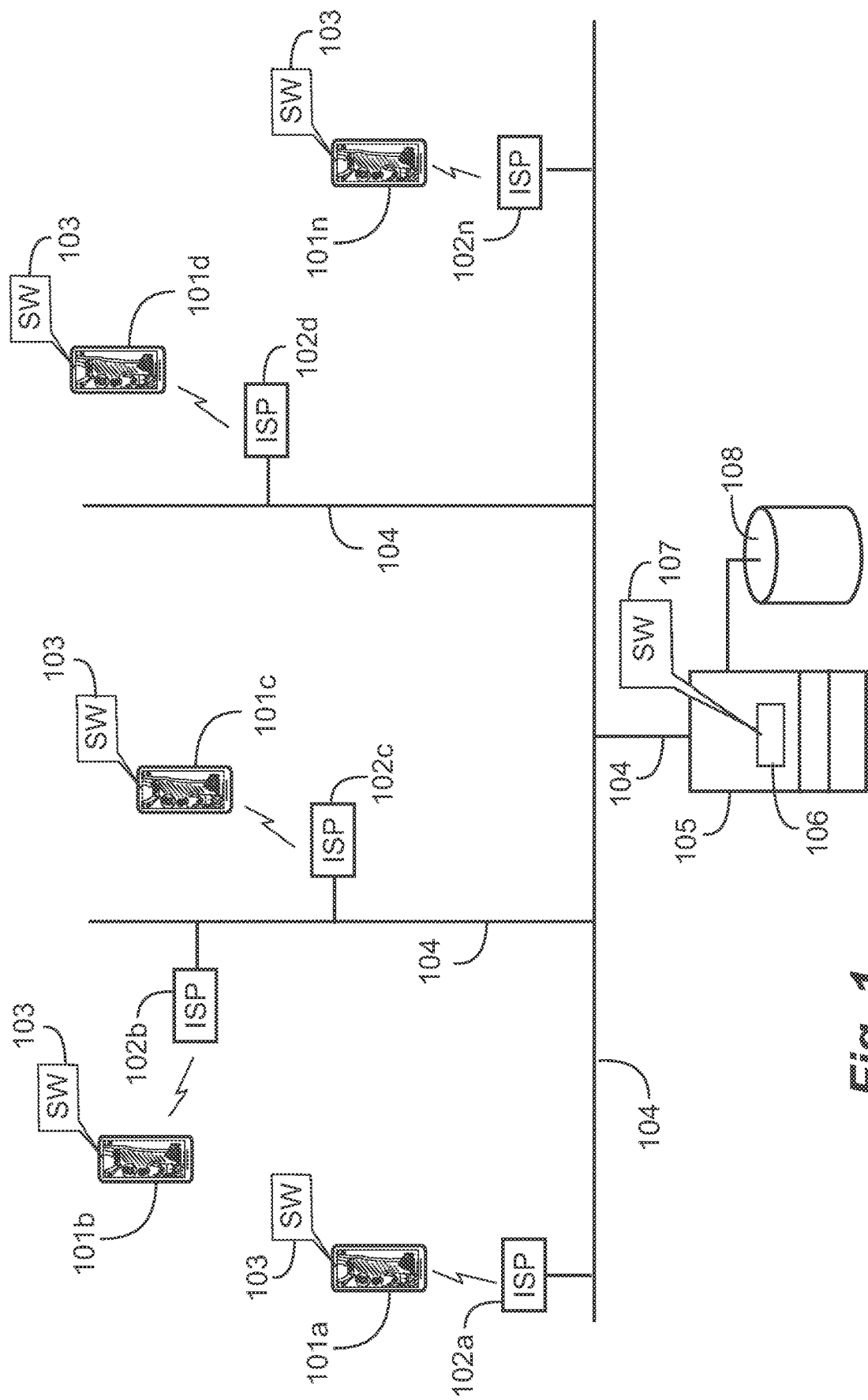
FIG. 1 is an architectural diagram of a system in an embodiment of the present invention.

FIG. 1 is an architectural diagram illustrating the Dysko system in one embodiment of the invention. In this example a plurality of smartphones 101a through 101(n) are shown, each executing an application 103, which in this example is the mobile application mentioned above. Some of the platforms 101a through 101n may be Apple devices, and some may be Android, and the platforms will be executing the appropriate mobile application, all designated 103 in FIG. 1, as the user downloads the appropriate application from the App store.

Persons and Brands participating in the Dysko system may be anywhere on Earth, and interaction between smartphones 101(a-n) is over the well-known Internet network, indicated in FIG. 1 by Internet backbone 104, which represents all the interconnected networks of the Internet. Each active smartphone, or other mobile device, in practicing the Dysko system connects to the Internet via an Internet Service Provider (ISP) 102(a-n). The ISP may be a WiFi modem in a residence or business or may be in some circumstances an ISP operated by a cellular network service in which the mobile device connects over the cellular network then to the Internet. There are a variety of ways that platforms connect to the Internet network, and FIG. 1 is meant to be inclusive. In any case all active mobile devices in FIG. 1 are connected to the Internet.

The Dysko system comprises an Internet-connected server 105 with a central processing unit (CPU) 106 executing software 107. Server 105 is coupled to a digital data repository 108 that in one instance executes a database proprietary to the Dysko system. As persons operating mobile devices 101(a-n) interact with one another and with Brands via the Internet certain functions are provided to individual ones of the mobile devices by server 105 executing SW 107 and communicating with data repository 108.

As was described above, to practice the Dysko system a user downloads an appropriate version of the Dysko mobile application from an App Store. Upon downloading and initiating the Dysko mobile application the user is directed through a series of configuration steps. The person may be directed in one step to upload a picture of herself or himself. This is preferably a picture that the user snaps using the smartphone's camera in the configuration process in real time. This assures that the picture identifies the person as correctly as possible.

The picture in one embodiment is an element in a profile stored in data repository 108 for the user. In configuring the profile, the user may be guided to enter biographic information, social messages, and importantly, a plurality of hashtags defining interests of the user.

In embodiments of the invention the system creates profile posts for users having profiles, which may be considered avatars representing users, and the profile posts may be provided in AR image data sent to other users and posted in displays on the user's mobile devices. The profile posts and functionality are described in enabling detail further below. The user in this configuration process also must authorize GPS location of his or her mobile device at least while the Dysko mobile application is executing. A user ID may be assigned for each user at configuration and is stored in the database in repository 108.

The Dysko system uses Augmented Reality (AR) device platforms (smartphones) or other Internet-capable platforms in order to position objects/posts in AR space in interactive AR displays provided to the users. Each object/post has a GPS location. Using the user's device GPS and compass data the object/post is positioned at a correct distance and direction in ARKit/ARCore world coordinates overlaid on a 3D grid that surrounds the user when using camera view when entering an AR mode. Since it is desirable to show each object/post at the same size, the object/post size is changed based on distance from the user in a display. This way the objects are at the same distance from the user's point of view, while in reality the objects can be near or far away. The Dysko application processes the device GPS raw data using algorithms like a Low Pass Filter to filter out noises and errors (due to low signal or indoor position) and makes updates to the server only when the updates are known to be relevant. For example, an update may be made if some movement is detected in a preprogrammed time span. The process of location management, update location and search for nearby users is managed by SW 107 (see FIG. 1) in a manner that allows an unlimited number of users to be updated in their location and to receive updates from the database in real-time.

The Dysko app detects that AR posts are moving according to the user's updated location every time the user moves. This data is represented by a new position in the 3D space/translated into new 3D coordinates. In addition, the system adjusts the product through the server for different users in different locations, like changing the radius of finding nearest neighbors. For example, a 5 km radius may be used in Los Angeles while a 30 km radius may be used in Colorado.

Figure 2:
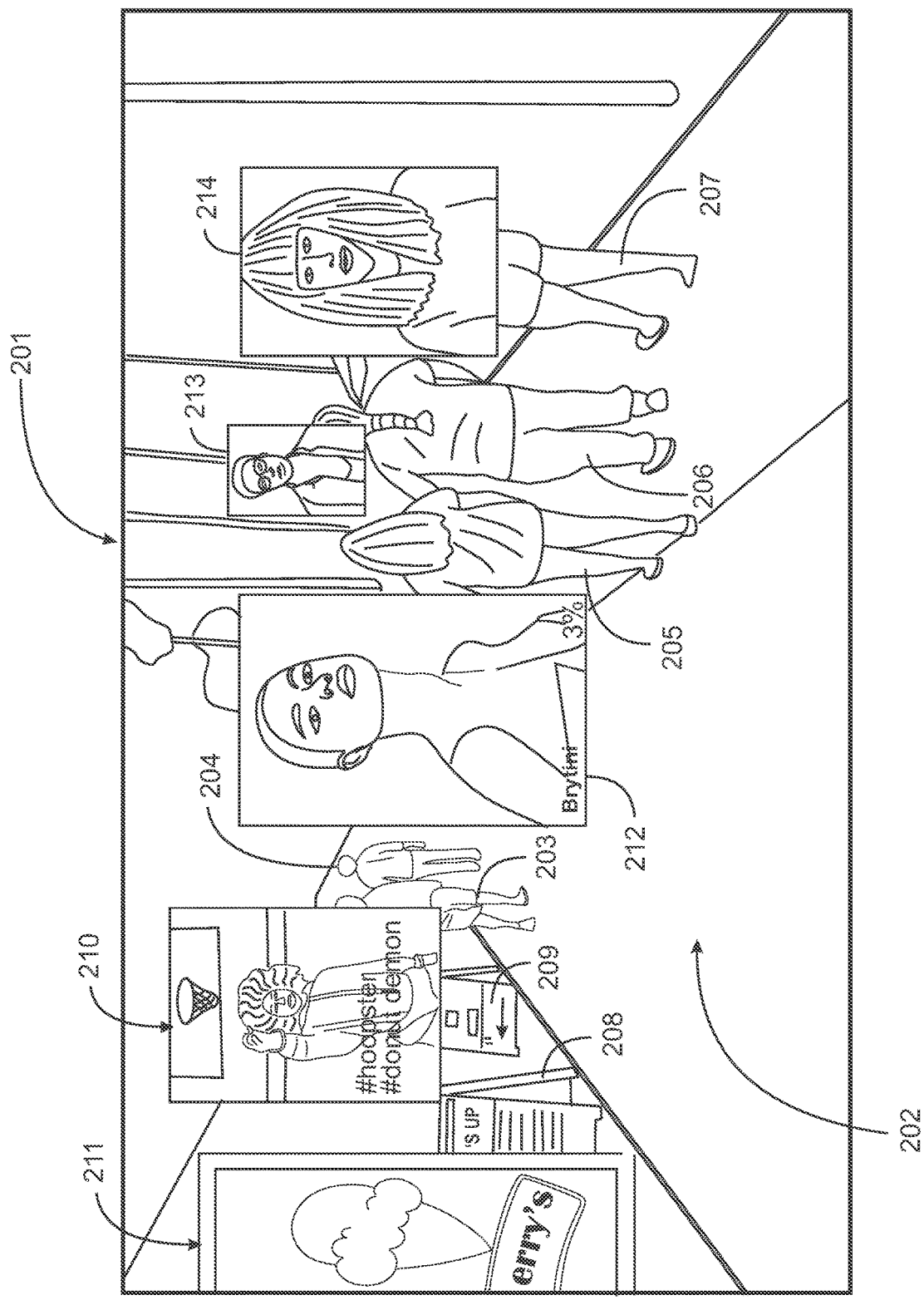
FIG. 2 is a Dysko AR display in an embodiment of the invention.

FIG. 2 is an example of a Dysko AR profile board 201 associated with a user, shown as displayed in AR on the display of the platform of that user, denoted here as "User Uno" for purposes of this description. Background 202 of profile board 201 is video data collected by the imaging device of the user's platform, which is transmitted via the Internet to server 105 (FIG. 1) and processed by AR software (part of SW 107) to prepare an AR display transmitted back to the platform of User Uno and displayed as profile board 201. The video background shows a walkway toward a vanishing point with objects and persons captured in the video. Five people 203, 204, 205, 206 and 207 are seen walking away from the platform capturing video data. There are two signs 208 and 209 seen on one side of the walkway, and some miscellaneous articles, like tree trunks, not annotated in the figure.

Also seen in FIG. 2 are five profile posts, four of these being 210, 212, 213 and 214 associated with other users and one Brand profile post 211 for Ben and Jerry's Ice Cream. Profile post 210 represents a user Aaron who has hashtags #hoopster and #donut demon.

The Dysko system in real time allows a user to be seen or connected with by other users or Brands, or b) to be shown to be at a specific GPS location on such as Google or Apple maps. The first user located thusly may then be discovered and seen by other users. The profile posts, which may have characteristics of avatars for the associated users, are displayed in board 201 for User Uno, retrieved from data repository 108 by SW 107 in the preparation of the AR display to be updated to User Uno and are selected and added to the AR image data according to a range of criteria, described in enabling detail below. In one embodiment the user associated with the profile board 201 may be enabled to swipe up on specific profile posts to remove those posts from the profile board display.

As described above, an important goal of the Dysko system is to enable users to match with and interact with other users and Brands. A basic mechanism for matching in the Dysko system is hashtags. Hashtags are well-known words or phrases preceded by a #symbol. In the configuration process the user is guided to populate his or her profile, stored in data repository 108 (FIG. 1) with hashtags that describe interests of that user, such as, for example #cofeelover, #theatergoer, #dance demon, and so on. Similarly, a Brand populates the Brand profile stored in data repository 108 with hashtags that describe the products and services of the Brand. Ben and Jerry's Ice Cream might use hashtags like #BenAndJerrys #IceCream #Dessert #Baskin-Robbins #ColdStone, and so on. A Brand member differs from a personal user in that the Brand is required to purchase advertising space.

When Dysko's users are in those areas that are designated by a Brand and have hashtags in their Dysko profile that match the Brand's tags, (as listed above) then that Dysko user will see Ben & Jerry's profile post in AR. Users are enabled to touch the B&J AR profile post and enter the Brand's profile where they will be able to see, menus, promotions, discounts, make purchases, and so forth.

In regard to other users, User Uno is guided in the configuration process to enter preferences for matching with other users, such as an age range, gender, education level and other, in addition to the hashtags. The system updates User Uno's Dysko profile board 201 in AR by determining which, if any, other users and Brands are in the space of User Uno's real time imaging and platform, and also match with hashtags and display preferences in User Uno's profile. In the instant display of Dysko profile board 201 five users/Brands meet the criteria, and their profile posts 210, 211, 212, 213 and 214 are thus displayed in the AR display data updated to User Uno's platform and posted in spatial relationship to User Uno's platform. Brytini 212 appears to be closest.

It should be understood that the users whose profile posts are displayed in User Uno's Dysko profile board 201 may also be actively following with their own platforms, with ASR profiles displayed.

As described above, an important goal of embodiments of the invention is to enable interaction and transaction between users and Brands. In one circumstance connection may be accomplished by Use Uno touching Aaron's profile post 210, and a signal of the fact of selection to server 105 results in SW 107 returning an interactive interface 301 illustrated in FIG. 3A. A "Connect" link 302 on interface 301, if selected, sends a signal to server 105 to open a video call to Aaron's mobile device through execution of SW 107. Interactive interface 301 in FIG. 3A shows the profile photograph 303 that Aaron provided in configuration.

User Uno may select the Connect link at this point, and open a video call to Aaron, but in some circumstances may prefer to know more about Aaron before opening a direct communication. In this circumstance User Uno might access Aaron's profile from interface 301 by selecting people icon 304, which signals server 105 to provide Aaron's profile 305 as illustrated in FIG. 3B. Aaron's profile provides User Uno with considerably more information about Aaron. For example, it displays additional photos 306 and 307 that Aaron provided in configuration, and location information 308. Additional personal information 309 is displayed indicating that Aaron is a Bruin, that is a student at UCLA, by day, and works as a DJ at night.

Profile 305 may also include videos and icons 310 indicating Aaron's favorite media accounts and websites. The additional information provided by viewing Aaron's profile may confirm or reverse a preference by User Uno to contact Aaron, and if positive, the Connect link 302 is provided at the upper right of the profile enabling initiation of a video call.

Figure 4B:
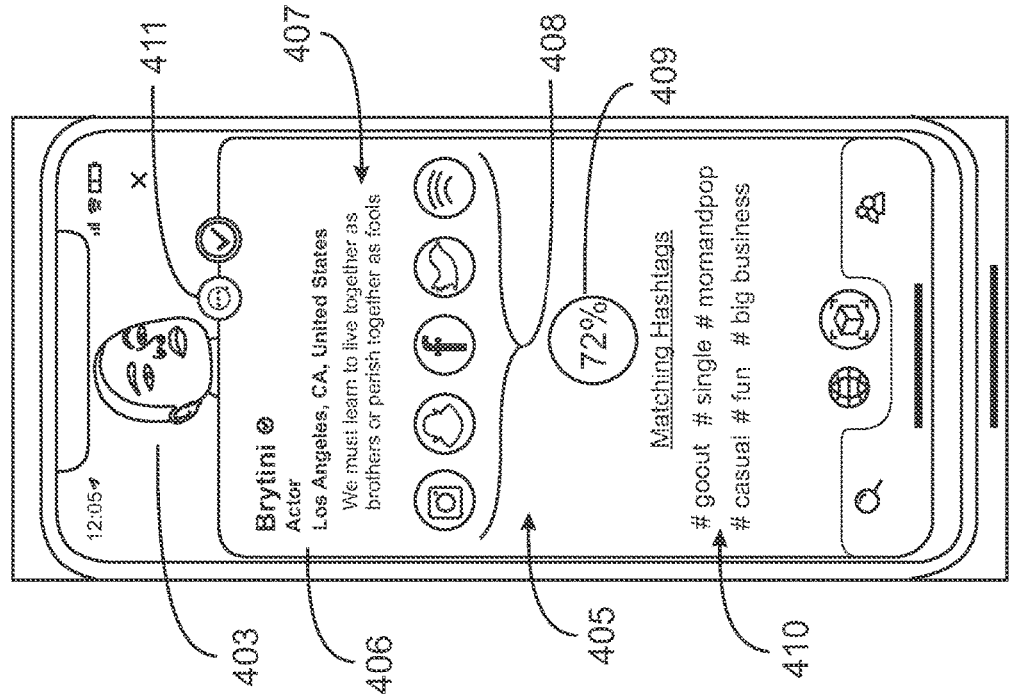
FIG. 4B illustrates the actual profile for the profile post of FIG. 4A.

Returning now to FIG. 2, profile post 212 is for a user Brytni. Wherever Brytni goes (qualified by privacy settings she chooses in configuration), her profile post may appear to other users who are active in the mobile application. A user selecting Brytni's profile post 212 will see interactive interface 401 returned by server 105 illustrated in FIG. 4A, which is analogous to profile post interface FIG. 3A for Aaron. Brytni's profile picture 403 is featured, and there is a connect link 402. Brytni's Dysko profile may be accessed by selecting icon 404, wherein the server returns display 405 in FIG. 4B.

Brytni's profile 405 has a portion of Brytni's photograph 403, and information 406, which discloses that she is an actor in LA. A favorite quote 407 is displayed as well as her favorite social media accounts 408. A post 409 tells the hashtag match between Brytni and the user accessing the profile as 72%. In addition, actual matching hashtags 410 are illustrated in this example. The skilled person will understand that the display and the information displayed may differ in location, design and content in different embodiments of the invention. A user can only see common hashtags, no others, thus a user can now keep their work and personal life in one account.

Figure 4A:
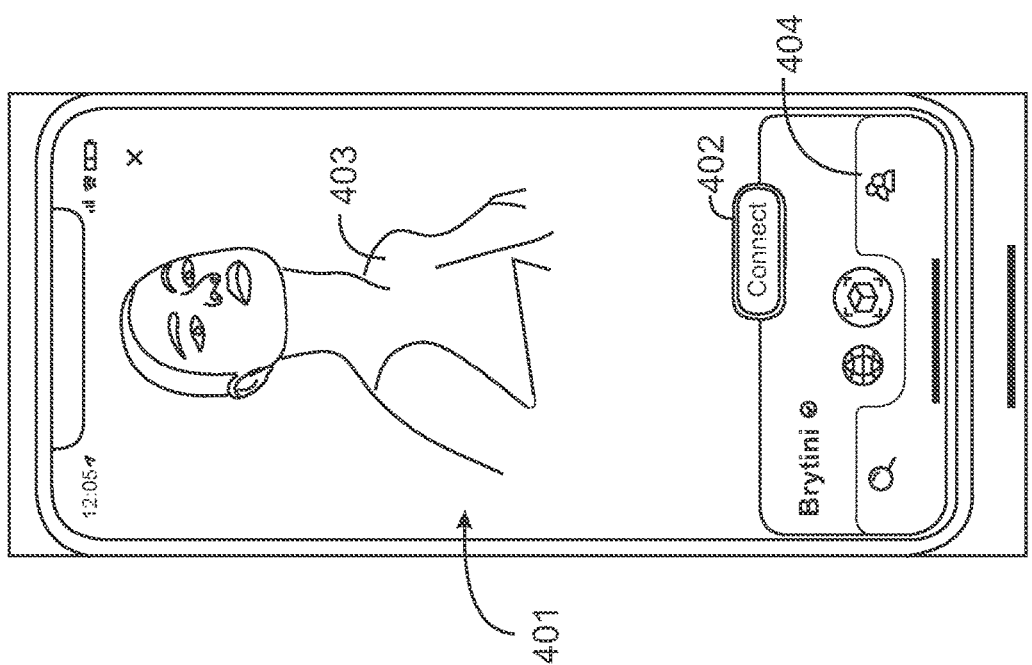
FIG. 4A illustrates another profile post for a user from FIG. 2.
Figure 5:
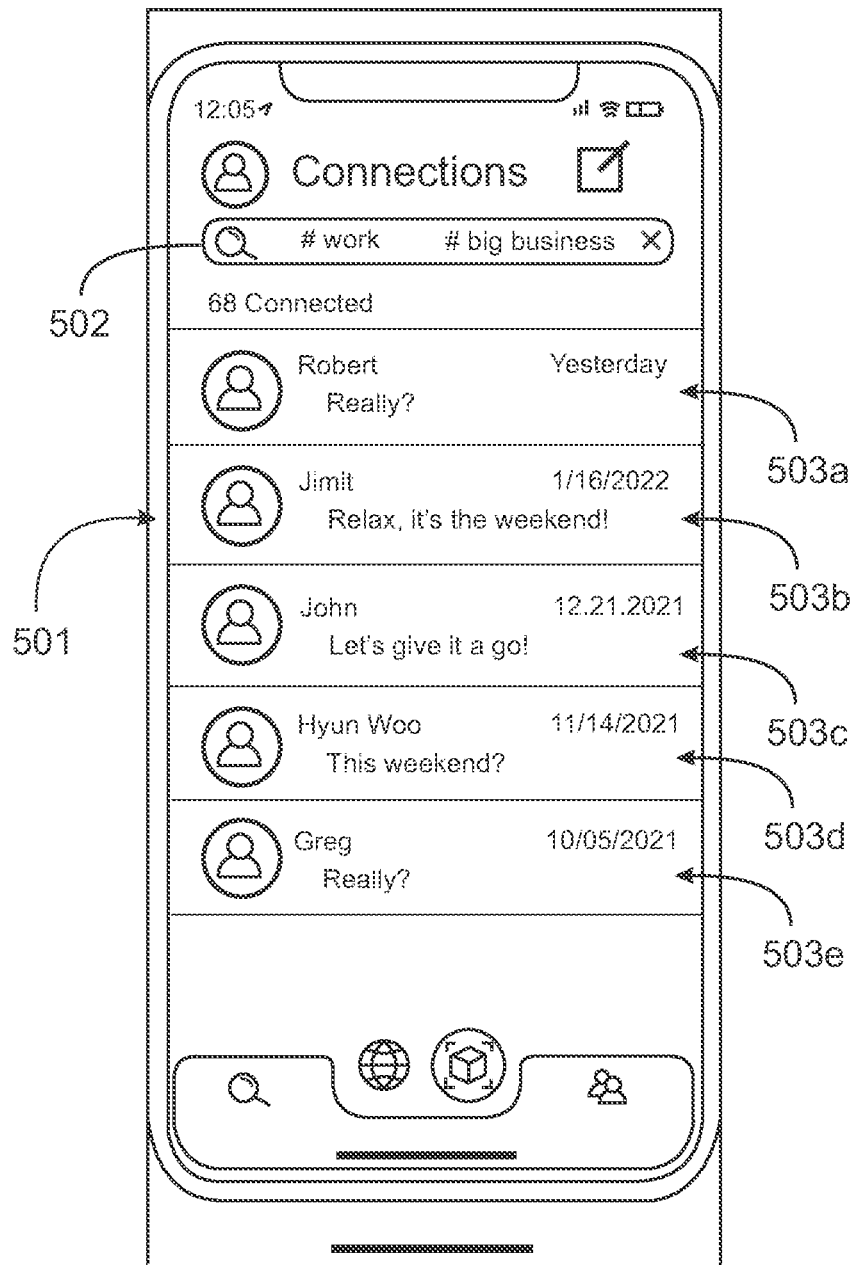
FIG. 5 illustrates a list of connections for a user in an embodiment of the invention.

FIG. 5 illustrates a display 501 returned after a user selects to connect to a user in that user's profile post (see Connect icon in FIG. 4A, for example). The user that gets a connection request may accept or decline. If the request is accepted, the accessing user's connections are then revealed by entering combinations of hashtags in a search field 502. In this example five previous connections 503a through 503e are illustrated along with the day of the connection. The picture icons in practice are actually photographs rather than the icons shown.

Figure 6:
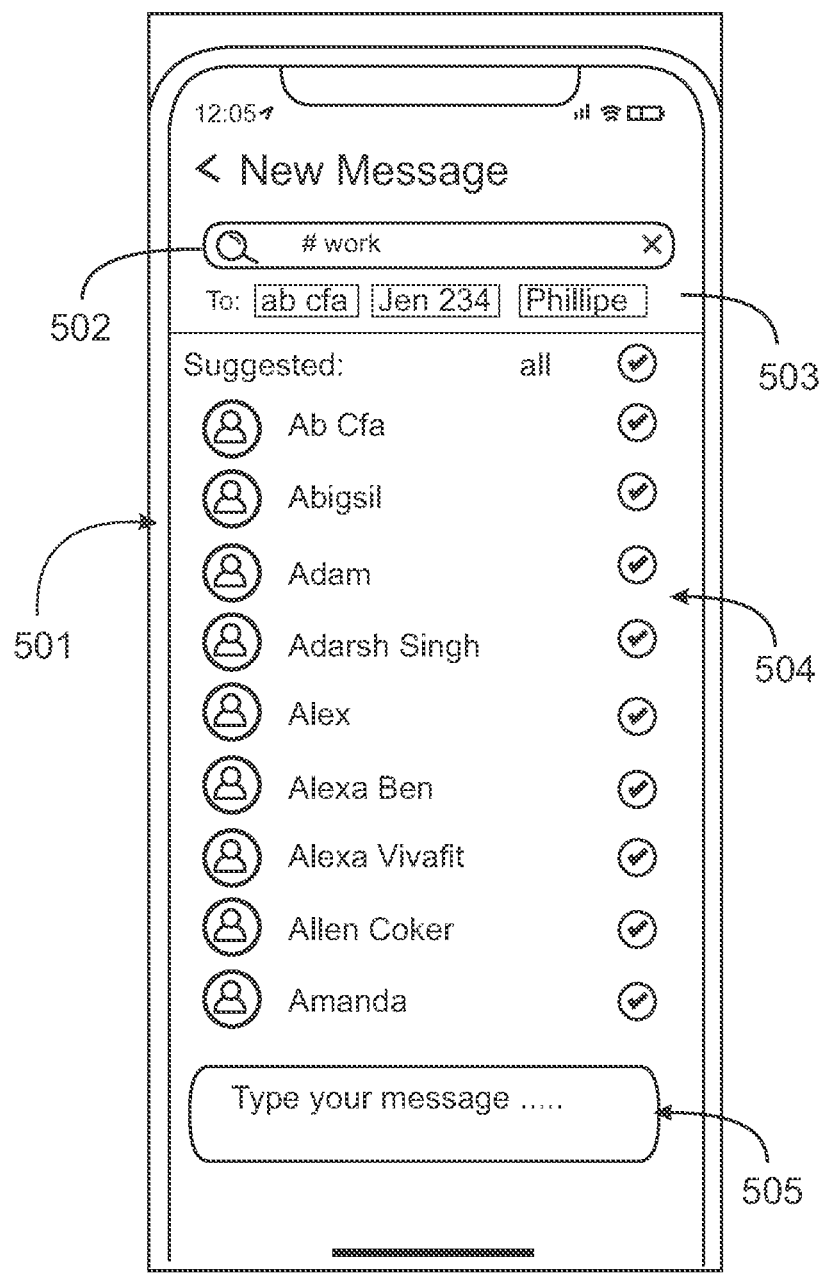
FIG. 6 illustrates a message initiation screen in an embodiment of the invention.

FIG. 6 shows a message initiation screen in which a user may compose just one message and send it as a separate message to all or any portion of matches (with no limit on the number). This "mass broadcast" messaging feature guarantees that every single one of a user's connections may hear from that user. Facebook/Instagram/Twitter's algorithm only allows for 10% of followers to see content posted. There is a search function 502 to search hashtags, and a scrolling list 503 to select recipients. A user may select all connections as recipients or select individually via a scrolling list 504. The message is entered in field 505.

Figure 7B:
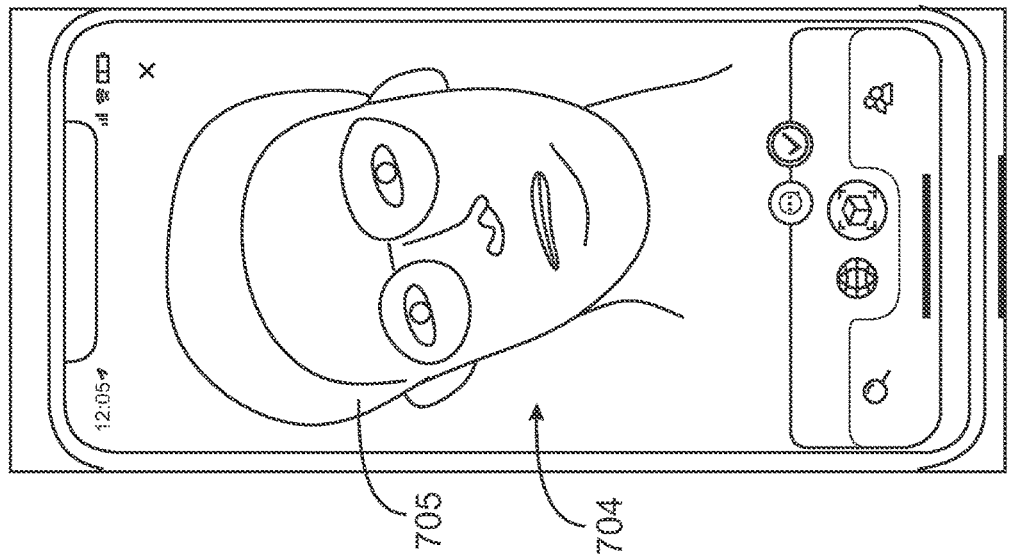
FIG. 7B is an enlarged display of the profile post of the user imaged in FIG. 7A.
Figure 7A:
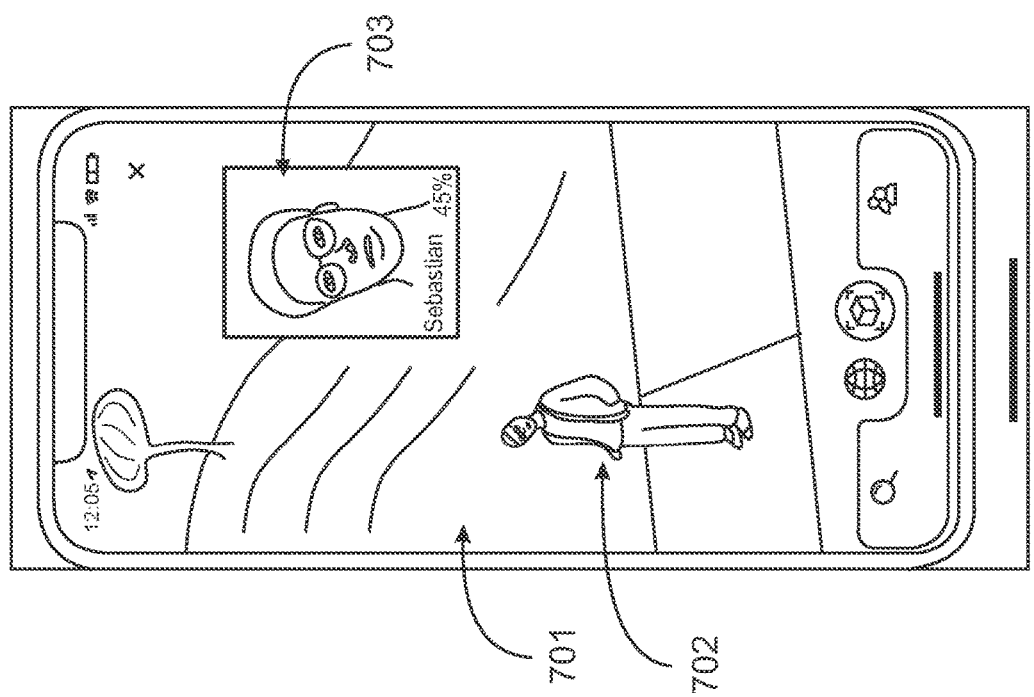
FIG. 7A illustrates an AR display on a user's platform, imaging another user.

FIG. 7A is a display back to a user employing the Dysko mobile app to image the user's son (Sebastian) 702 in AR display 701 via the user's smartphone's camera. In this example Sebastian's profile post 703 is overlaid in the AR display, as the server recognizes Sebastian in the image data transmitted via the user's phone and by GPS. Sebastian's profile post 703 shows the user is a 45% commonality with Sebastian, based on respective hashtags. The user may also touch Sebastian's profile post 703 and his security and privacy settings are accessible. FIG. 7B is an enlarged view of Sebastian's profile post from FIG. 7A.

Figures 8A, 8B:
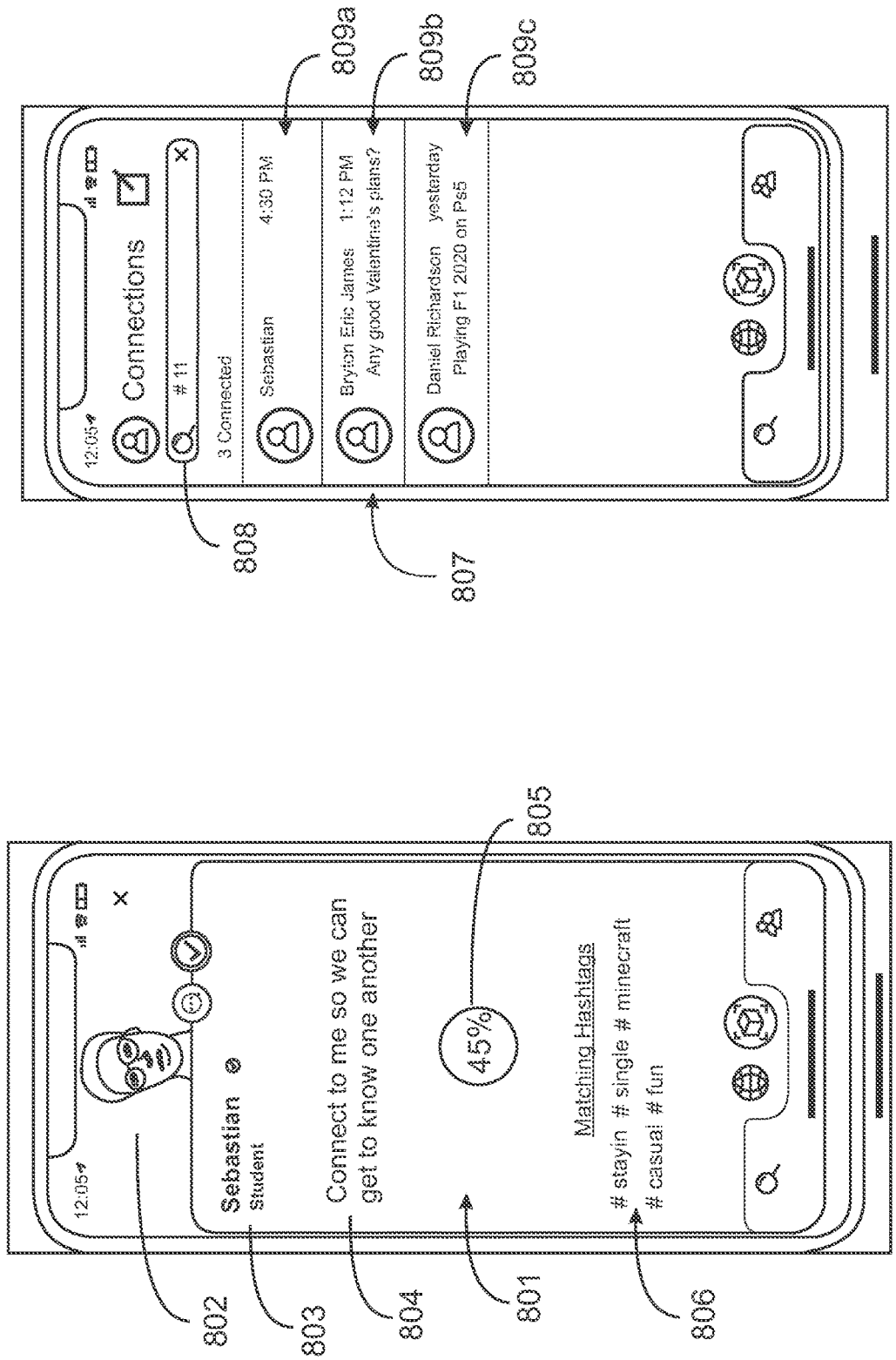
FIG. 8A illustrates the profile of the user imaged in FIG. 7A.
FIG. 8B illustrates a connection list for the user imaged in FIG. 7A.

FIG. 8A is a display 801 of Sebastian's profile with a partial picture 802 of Sebastian and information 803 entered by Sebastian in configuration, disclosing that Sebastian is a student. A social comment 804 is presented from Sebastian. A post 805 tells the hashtag match as 45% between Sebastian and the person accessing Sebastian's profile. Actual matching hashtags 806 are illustrated as well. FIG. 8B illustrates display 807 showing connections 809a through 809c for Sebastian.

Figure 9:
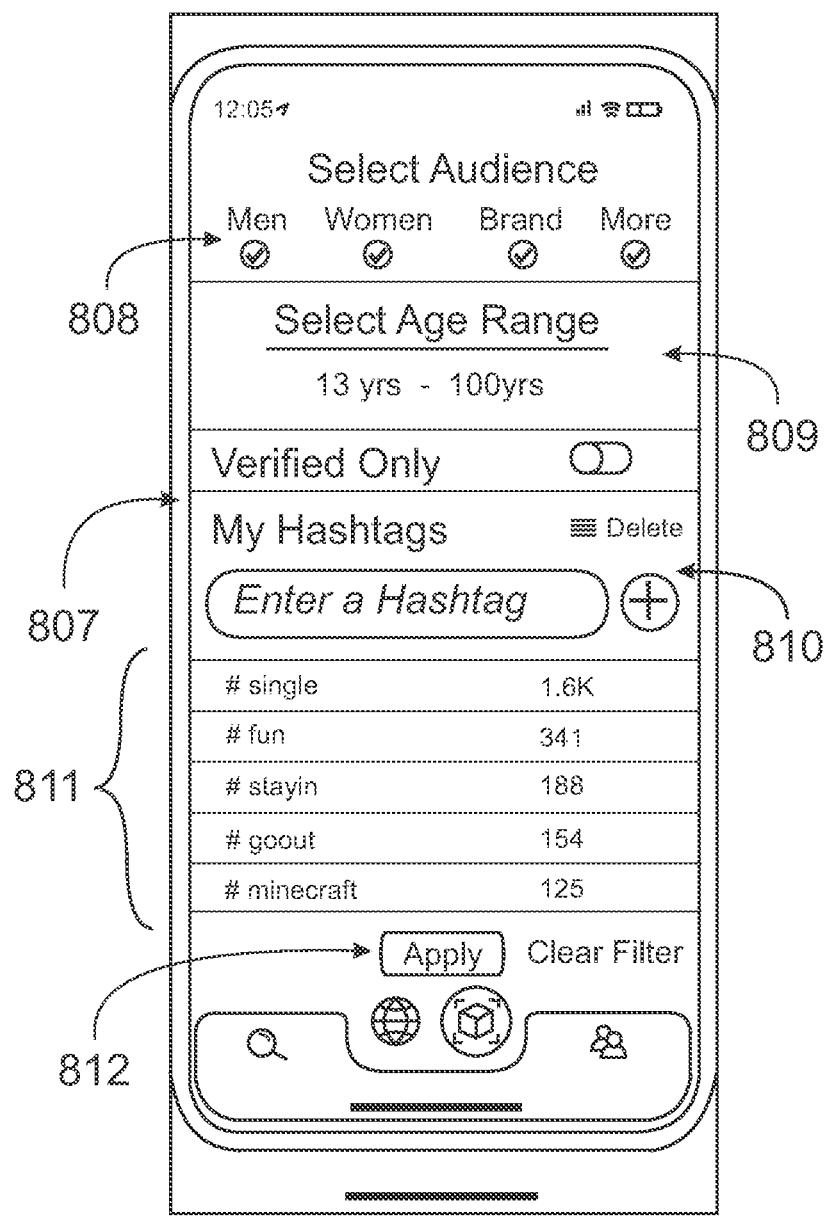
FIG. 9 illustrates a configuration screen enabling a user to filter whose profile posts may appear in an AR on that user's platform.

FIG. 9 is an interactive interface 807 in configuration wherewith a user may enter criteria to filter whose profile post may appear in a Dysko profile board for that user (see FIG. 2). In this interactive interface the user can specify at 808 criteria for an audience, such as Men, Women, Brands, and more. The user may make multiple selections and choosing "more" opens additional selections. At 809 the user can select an age range to filter whose profile posts may appear, and in this case the user has selected 13 years to 100 years of age.

At 810 the user may enter and edit the user's hashtags that will be used for matching with others. There is an entry field for entering a new hashtag, which clears for another by a Plus link. Five hashtags for this user are listed as list 811. This may be a scrolling list. Apply button 812 enables the user to update his or her configuration after making edits and additions.

In an alternative embodiment there may be icons posted with a profile board to quickly impose filters on the characteristics of profile posts that may appear. There may be an icon for example to see all users. Another may be to see only hashtag matches. Another may be to see only drop-ins. Another may be to see only in-person users.

The Dysko app associates the GPS location with individual profiles by storing locations for each user ID in a central database. An avatar image URL can be looked up for each user by ID. Avatar selection sets the associated avatar's user ID as a transaction target. The avatar has an associated user ID which the system API can resolve to GPS position. The Dysko app allows a user to toggle between users within ¼, ½ and 1 mile. With distances being unlimited thus allowing users to see profiles up to any distance away. These are not limitations in the scope of the invention, as they may change in other versions and embodiments.

In addition to functionality described above, the Dysko app allows any user to enter a location, whether it is an address or a landmark and then, from a remote location, i.e. the comfort of their living room, backyard or the top of a volcano in Hawaii, that user can see, in augmented reality, profile posts (avatars) of real users at or near the location. The other user's profile posts appear, as described above, dependent on hashtag and other matches. What this accomplishes is to allow a convention in Las Vegas, for example, to be attended either in the flesh, or in augmented reality, providing the remote attendees have the ability to match #hashtags and then may communicate and network from anywhere in the world with the "in person" attendees.

The Dysko app and functionality at the server provides AR matching technology to allow Pop-Up AR conventions, gatherings, parties and meetings etc. to take place anywhere in the world, and to be attended by anyone with Dysko's AR matching technology according to embodiments of the present invention.

Another example may be such as Bank of America decides to hold a convention at the Great Pyramid of Giza, in Cairo, Egypt. People/shareholders etc. can then receive an access code and from anywhere in the world and virtually attend, meet, network and interact with other Dysko users who match, via hashtag matching, with them in augmented reality. Other examples might include "A school reunion under the Eiffel Tower." or even hosting your "Wedding in the garden of the palace of Versailles!"

The Dysko system provides for AR spaces the inventor terms AR "rooms" These rooms may be analogous in some implementations to ZOOM™ rooms. In this technology Swift™ and ARkit™ may be used for framework, WebSocket™ technology may be incorporated for real-time data transfer like chat room, comments and so forth. Posts may be created around the user in $3d$ space on top of the camera. The angle and the radius for the user for each post are calculated so they won't overlap. Web RTC™ or AVkit™ are incorporated in order to stream real time video and audio. If there are a large number of users in a room a product-related solution may be needed. For the server side and backend Phyton™ and Django™ may be used.

The skilled person will understand that the illustrations and descriptions herein are entirely exemplary and are not limiting to the scope of the invention. The scope is limited only by the claims.

The invention claimed is:

1. A matching and communication system, comprising:
a first mobile device associated specifically with a first user, the first mobile device having first imaging apparatus and first GPS circuitry, executing a mobile application, and coupled to an Internet network;
a second mobile device associated specifically with a second user, the second mobile device having second imaging apparatus and second GPS circuitry, executing the mobile application, and coupled to the Internet network;
an Internet connected server having a processor executing coded instructions, and coupled to a data repository;
a first profile for the first user, comprising a photograph of the first user and a plurality of first hashtags in the first profile, the first profile stored in the data repository; and
a second profile for the second user, comprising a photograph of the second user and a plurality of second hashtags in the second profile, the second profile stored in the data repository;
characterized in that the first user captures image data by the first imaging apparatus of the first mobile device, the image data is transmitted to the internet connected server, the internet connected server, executing the coded instructions, determines by GPS that the second mobile device is proximate the first mobile device, creates a profile post from the profile of the second user, the profile post comprising the photograph of the second user, determining a predetermined percentage match of hashtags of the second user with hashtags of the first user, the predetermined percentage match being met, combines the profile post with the image data received from the first user by an augmented reality (AR) algorithm, transmits the resulting augmented reality image data back to the first mobile device, and the first mobile device displays the augmented reality image data on a display of the first mobile device with the profile post of the second user positioned and sized in the display according to relative position of the first and second mobile devices determined by the internet connected server.

2. The matching and communication system of claim 1 further comprising the profile post for the second user in the display of first mobile device rendered as a link that when selected navigates to an enhanced version of the profile post comprising a connect link adapted to initiate a video call from the first mobile device to the second mobile device.

3. The matching and communication system of claim 2 wherein the enhanced version of the profile post comprises a link adapted to navigate to a display of the profile of the second user, comprising at least a name and location of the second user, additional image data of the second user, a social message by the second user, and additional information regarding the second user.

4. The matching and communication system of claim 1 wherein posting of the profile post of the second user in the AR display requires satisfying additional criteria regarding the profile of the second user to the matching of hashtags.

5. The matching and communication system of claim 4 wherein the additional criteria comprise at least gender, brand, and an age range.

6. The matching and communication system of claim 1 further comprising a plurality of second mobile devices associated with specific second users, a plurality of second profiles for the second users, each second profile comprising a photograph of the specific second user and a plurality of hashtags in each second profile, the second profiles stored in the data repository, wherein profile posts for individual ones of the plurality of second users are posted in the first user's AR display depending on a predetermined hashtag percentage match to hashtags of the first user, and the postings are positioned and sized in the AR display according to relative positions of the plurality of second mobile devices determined by the internet connected server.

7. The matching and communication system of claim 1 further comprising a computerized platform associated with a Brand, being an enterprise offering products and services, and a third profile for the Brand, the third profile comprising hashtags defining products and services offered by the Brand;
wherein the third profile comprises selected locations for displaying a profile post for the Brand, and wherein, when the location of the first mobile device is proximate a selected location for the Brand, a profile post for the Brand is transmitted in the AR image data to the first mobile device, and the Brand profile post displays in the display of the first mobile device positioned and sized in the display according to relative position of the first mobile device and the selected location for the brand profile post.

8. The matching and communication system of claim 7 wherein selecting the Brand profile post by the first user navigates to the third profile, and an interactive interface is presented to the first user enabling interaction with the Brand, including transacting for products and services of the Brand.

9. A matching and communication system, comprising:
a plurality of mobile devices associated with specific users, each mobile device having GPS circuitry and imaging apparatus and executing an appropriate version of a mobile application;
an Internet connected server having a processor executing coded instructions, and coupled to a data repository;
a plurality of user profiles, one per user stored in the data repository, each profile comprising a plurality of hashtags;
a plurality of avatars, one associated with each profile, stored in the data repository, each avatar comprising a picture of the user associated with the profile;
characterized in that an individual ones of the plurality of users are enabled to enter a location anywhere on Earth, and the system in response will stream and display AR image data to that entering user's mobile device, regardless of the device location, the AR image data including avatars for users and LIVE AR video feeds, at or near the entered location, the AR image data display requiring a predetermined percentage match of hashtags of the users at or near the entered location and the entering user, and wherein the individual users are enabled to select any avatar displayed and to initiate an interaction with the user associated with the avatar via any one of text, chat, voice messaging, calls and video chat.

10. The matching and communication system of claim 9 wherein users are enabled to schedule interactions with other users by organizing an event to occur at a specific location over a specific time period and to select specific users to be invited by sending a code, to attend and interact with other user's avatars at the event, wherein avatars are displayed as a result of satisfying match criteria.

\* \* \* \* \*